(12) United States Patent
Frey

(10) Patent No.: US 7,431,871 B2  
(45) Date of Patent: Oct. 7, 2008

(54) METHOD FOR REGULATING THE CONTRACTION OF MOLDED PARTS

(75) Inventor: Jürgen Frey, Kirchheim/Teck (DE)

(73) Assignee: Priamus System Technologies AG (CH)

( * ) Notice: Subject to any disclaimer, the term of this patent is extended or adjusted under 35 U.S.C. 154(b) by 89 days.

(21) Appl. No.: 10/472,861

(22) PCT Filed: Mar. 14, 2002

(86) PCT No.: PCT/EP02/02844

§ 371 (c)(1), (2), (4) Date: Sep. 19, 2003

(87) PCT Pub. No.: WO02/076704

PCT Pub. Date: Oct. 3, 2002

(65) Prior Publication Data

US 2004/0131715 A1    Jul. 8, 2004

(30) Foreign Application Priority Data

Mar. 22, 2001    (DE)    ................. 101 14 228

(51) Int. Cl.
*B29C 45/78* (2006.01)

(52) U.S. Cl. .................... 264/40.6; 264/40.1

(58) Field of Classification Search ................ 264/40.6; 425/143, 149
See application file for complete search history.

(56) References Cited

U.S. PATENT DOCUMENTS

| | | | | |
|---|---|---|---|---|
| 3,941,534 A * | 3/1976 | Hunkar | ....................... | 425/145 |
| 4,615,849 A * | 10/1986 | Hahn | ....................... | 264/40.4 |
| 4,623,497 A * | 11/1986 | Waters | ....................... | 264/40.6 |
| 4,671,696 A * | 6/1987 | Suzuki et al. | ................ | 403/265 |
| 4,850,217 A * | 7/1989 | Nunn | ....................... | 73/54.11 |
| 4,983,336 A * | 1/1991 | Langlois | ..................... | 264/40.5 |
| 5,296,174 A * | 3/1994 | Yakemoto et al. | .......... | 264/40.5 |
| 5,427,720 A * | 6/1995 | Kotzab | ....................... | 264/40.6 |
| 5,720,912 A * | 2/1998 | Liehr et al. | ................. | 264/40.6 |
| 5,772,933 A * | 6/1998 | Kotzab | ....................... | 264/40.6 |
| 6,500,368 B1 * | 12/2002 | Sameshima et al. | ........ | 264/40.6 |

* cited by examiner

*Primary Examiner*—Monica A Huson  
(74) *Attorney, Agent, or Firm*—Bachman & LaPointe, P.C.

(57) ABSTRACT

A method for regulating the contraction of molded parts in a cavity in a mold of an injection molding machine after completing the filling process of the cavity with molten mass. According to the method, the temperature of the mold is regulated, whereby the temperature and/or the internal pressure in the cavity is monitored and adapted to a reference curve by performing temperature equalization of the mold from the end of the filling phase or from a maximum pressure in the cavity until the end of the injection cycle.

3 Claims, 2 Drawing Sheets

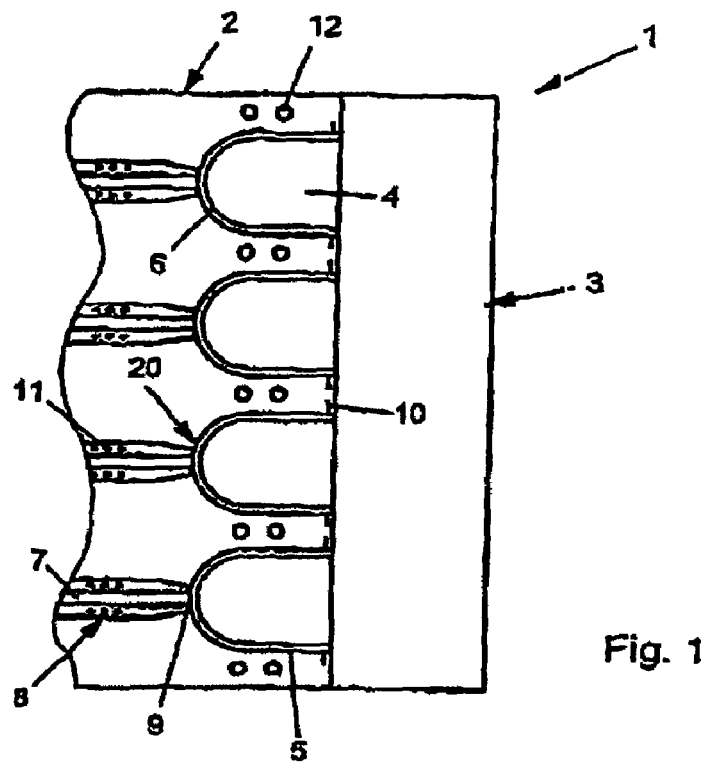
Fig. 1
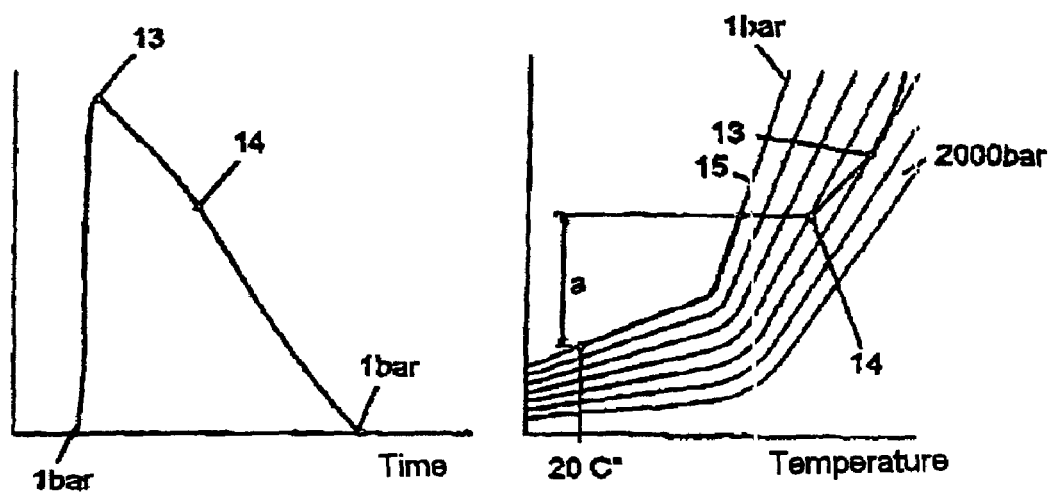
Fig. 2a
Fig. 2b

METHOD FOR REGULATING THE CONTRACTION OF MOLDED PARTS

BACKGROUND OF THE INVENTION

The invention relates to a method for controlling the shrinkage of injection moldings in a cavity in a mold of an injection-molding machine after the operation of filling this cavity with a molten material has ended, with the temperature of the mold being controlled, and to a device used for this purpose.

In known methods used to fill a mold for example with thermoplastics, the filling operation is controlled in such a way that an initial speed-managed phase is followed by a pressure-managed phase which lasts until the end of the filling operation. Toward the end of the speed-managed phase or in the starting section of the pressure-managed phase, the filling situation in which the impression is completely wetted with plasticizable material is reached yet the pressure of the material in the interior of the impression is still relatively low. On account of the continuing movement of an injection plunger or an extruder, the internal pressure in the mold rises, which is associated with a reduction in the specific volume or an increase in the density of the molding material inside the impression. The extent of compression which can be achieved in this way is dependent both on the prevailing temperature and on the level of the pressure which is active and on the characteristic properties of the molding material.

After the supply of molten material to the impression has stopped, the molten material in the gate starts to solidify. This seals the impression, making it impossible for any further molten plastic to be supplied. The temperature in the impression drops until the one-bar isochor is reached. The molding then begins to shrink until the molding has reached room temperature.

The shrinkage of the molding is determined by the pressure and temperature conditions and also in particular by the viscosity of the molten material in the cavity. A significant factor in the shrinkage of the molding is the temperature distribution in the cavity at the end of the filling phase (or from the pressure maximum) until the end of the cycle. A differing shrinkage from cycle to cycle results from the fluctuation of the temperature profile and from the fluctuation of the mold internal pressure profile.

This applies both to single molds and to multi-impression molds. When producing injection moldings of all types (plastic, metal, ceramic, etc), for cost reasons it is often the case that a plurality of moldings are produced simultaneously each cycle (multi-impression mold). In this case, the individual cavities are normally balanced with regard to geometry and gate points to a sufficient extent for the quality of the injection moldings to be as uniform as possible. In reality, however, the shrinkage of the individual injection moldings is always different, and also changes constantly, on account of material fluctuations, temperature fluctuations and resulting fluctuations in viscosity.

It is an object of the present invention to provide a simple method which enables the shrinkage of the molding to be made as uniform as possible both between individual cavities of a multi-impression mold and also from cycle to cycle of an injection-molding operation.

SUMMARY OF THE INVENTION

The foregoing object is achieved by virtue of the fact that the temperature and/or an internal pressure in the cavity is monitored and is matched to a reference profile by controlling the temperature of the mold from the end of the filling phase or from a pressure maximum in the cavity until the end of the injection cycle.

Matching the current temperature or mold internal pressure profile to a reference profile from the end of the filling phase until the end of the cycle keeps the shrinkage of the injection molding constant. The same also applies to a multi-impression mold in which the temperature or mold internal pressure profiles of the individual cavities are monitored and controlled individually from the end of the filling phase until the end of the cycle.

To ensure uniform shrinkage, atmospheric pressure must be reached at the same mold wall temperature. To determine atmospheric pressure, the mold internal pressure is measured and at the same time the mold temperature is determined. In this way, by suitable control, it is possible to achieve the same level of shrinkage given the same physical conditions.

Since the mold internal pressure decreases continuously along the length of the flow path on account of the viscosity of the structure, it has proven advisable for a mold internal pressure sensor to be positioned close to the gate in order to obtain as much information as possible. However, this is not imperative and could even be disadvantageous in the event of what is known as a residual pressure, i.e. in the event of atmospheric pressure not being reached on account of mold deformation.

Contrary to earlier assumptions, with regard to the arrangement of the temperature sensor it has emerged that the measurement corresponding to the internal pressure does not have to take place at precisely the same location, but rather, to simplify matters, the temperature sensor can be installed in the region of the temperature-control circuit in question. It is preferably arranged at the end of the flow path, since the temperature sensor can also fulfill further objectives at this point.

In the case of large-area moldings, a relatively large cavity is required. Therefore, it must be assumed that a plurality of temperature-control circuits are distributed over the flow path. To control shrinkage, a temperature sensor must be positioned in the region of the same temperature-control circuit in which the mold internal pressure sensor is also located. In addition, it is possible for a temperature sensor and optionally a pressure sensor to be installed in each further region of a temperature-control circuit all the way to the end of the flow path, with the aid of which the shrinkage is controlled in these regions too. The time at which the various temperatures are controlled is determined by the mold internal pressure when atmospheric pressure is reached. The temperature of the temperature-control medium is adjusted until the profile of the mold internal pressure from the maximum until atmospheric pressure is reached, on the one hand, and the profile of the mold temperature from the maximum until the value corresponding to atmospheric pressure, on the other hand, correspond to a predetermined reference value (good-quality molding).

In a preferred exemplary embodiment of the invention, the two parameters are not compared with one another on a time basis, but rather are plotted against one another, so that absolute correspondence results in a 45° straight line.

The control itself takes place completely independently of the injection-molding machine and affects only the temperature-control system of the mold.

BRIEF DESCRIPTION OF THE DRAWINGS

Further advantages, features and details of the invention will emerge from the following description of preferred exemplary embodiments and with reference to the drawing, in which:

FIG. 1 shows a diagrammatically depicted cross section through an injection mold;

FIG. 2a and FIG. 2b show diagrams illustrating the pressure profile and temperature profile while a cavity is being filled;

DETAILED DESCRIPTION

Figure 3:
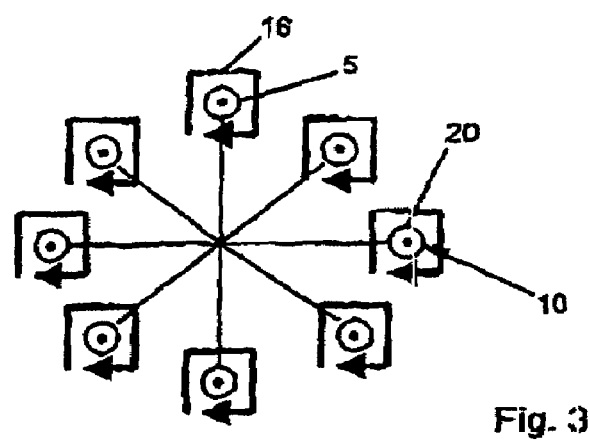
FIG. 3 diagrammatically depicts cavities of a multi-impression injection mold.
Figure 4:
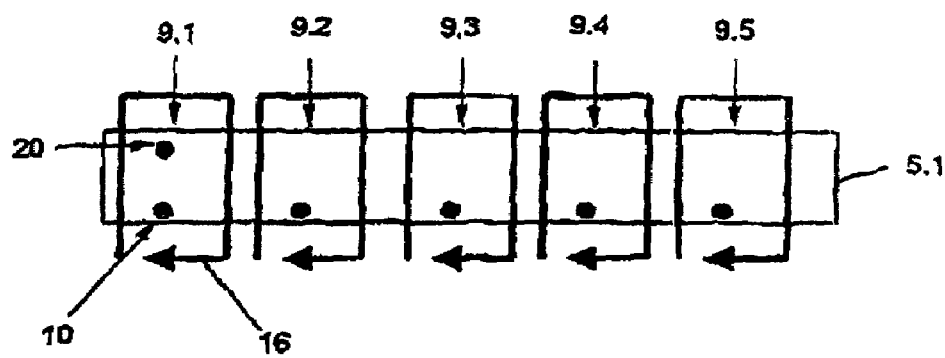
FIG. 4 diagrammatically depicts a cavity of an injection mold for large-area moldings.

FIG. 1 illustrates a closed injection mold 1. It substantially comprises two mold plates 2 and 3, with cores 4, which in the closed position engage in cavities 5 in the mold plate 2, projecting from the mold plate 3. Cores 4 and cavities 5 together in each case form an impression 6 which, by way of example, may be filled by a molten plastic. This plastic is passed through a hot runner 7 of a nozzle 8 and injected into the impression 6 at a gate 9.

According to the invention, it is preferable for each cavity 5 to be assigned at least one temperature sensor 10. This temperature sensor 10 is located at the end of the filling path of the cavity 5, preferably at approximately 95-98% of the filling path of the cavity. Furthermore, the cavity 5 is assigned a pressure sensor 20 which is provided in the vicinity of the gate 9.

In the nozzles 8 there are heating passages 11, by means of which a molten plastic in the hot runner 7 is held at a desired temperature. By contrast, in the mold plate 2, in the region of the cavities 5, there are cooling passages 12, which in turn bring the plastic in the impression 6 to a desired temperature, so that it solidifies there after a desired period of time and the molded article can be removed from the cavity 5.

It can be seen from FIG. 2a that when the cavity 5 is being filled with molten material, the pressure rises very quickly up to a maximum 13 then drops more slowly until a sealing point 14 at which the gate is closed.

The pressure then drops further to 1 bar and ultimately a temperature of 200 Celsius is reached.

If in particular the sequence of events after the filling operation has ended is plotted against temperature in accordance with FIG. 2b, the pressure maximum can be seen at 13. The temperature then drops to the sealing point 14 and then to the 1-bar isochor 15, with the shrinkage of the molding now commencing. The molding shrinks in the area a until the temperature of 20° Celsius is reached. Then, the molding is removed from the cavity 5.

The way in which the present invention functions is explained with reference to FIGS. 3 to 5b.

FIG. 3 diagrammatically depicts a multi-impression mold. Each individual cavity 5 is assigned a dedicated temperature-control circuit 16 which, by way of example, includes the cooling passages 12. Furthermore, each cavity 5 is assigned a pressure sensor 20 and a temperature sensor 10.

The temperature sensor 10 monitors the temperature in the cavity 5, while the internal pressure in the cavity 5 is determined by the pressure sensor 20. The corresponding measurement of the two parameters does not have to take place exactly at the same location, but rather, to simplify matters, may take place in the region of the corresponding temperature-control circuit 16. Each individual temperature-control circuit 16 is controlled by adjusting the temperature of the temperature-control medium until the profile of the mold internal pressure from the maximum until atmospheric pressure is reached, on the one hand, and the profile of the mold temperature from the maximum to a value corresponding to atmospheric pressure, on the other hand, corresponds to a predetermined reference value.

Figure 5A:
FIGS. 5a and 5b show diagrams illustrating the pressure drop during shrinkage of an injection molding in a cavity.
Figure 5B:
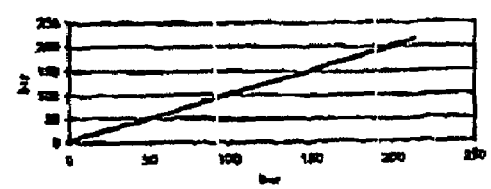

In accordance with FIG. 5b, the two parameters are not compared with one another on a time basis, but rather are plotted against one another, so that in the case of absolute correspondence a 45° straight line is shown. This form of presentation is preferred, although FIG. 5a also illustrates the pressure profile after filling against time.

In the case of a mold in which large-area moldings are produced, the cavity 5.1 is significantly enlarged. Therefore, a cavity 5.1 of this type also has a plurality of gates 9.1 to 9.5, with at least the gate 9.1 also being assigned a pressure sensor 20. Of course, depending on the particular requirements, it is also possible for the other gates 9.2 to 9.5 to each be assigned a pressure sensor 20. However, this is not imperative.

Furthermore, the cavity 5.1 has a plurality of temperature-control circuits 16 and a plurality of temperature sensors 10.

Control is effected in the manner described above.

The invention claimed is:

1. A method for controlling the shrinkage of injection moldings in a cavity in a mold of an injection-molding machine after the operation of filling the cavity with a molten material has ended, comprising positioning a temperature sensor and a pressure sensor in a mold cavity, monitoring the temperature of and internal pressure in the mold cavity with the temperature sensor and the pressure sensor, respectively, continuously from the end of the filling phase or from a pressure maximum in the mold cavity until the end of the injection cycle matching the monitored temperature and internal pressure to a reference profile by controlling the temperature of the mold from the end of the filling phase or from a pressure maximum in the cavity until the end of the injection cycle, wherein the mold temperature is controlled so that atmospheric pressure is always reached at the same mold temperature.

2. The method as claimed in claim 1, wherein the monitored temperature and/or pressure profile is plotted against the respective reference profile.

3. The method as claimed in claim 1, wherein the pressure sensor is positioned close to a gate and the temperature sensor is positioned toward the end of the flow path of the molten material.

* * * * *